United States Patent [19]
Mahaffey, Jr. et al.

[11] Patent Number: 5,935,272
[45] Date of Patent: Aug. 10, 1999

[54] COMPOSITIONS COMPRISING ARYLOXYPOLYOXYALKYLENE NAPHTHALIMIDE DERIVATIVE COLORANTS

[75] Inventors: Robert L. Mahaffey, Jr.; James M. Spry, both of Spartanburg, S.C.

[73] Assignee: Milliken & Company, Spartanburg, S.C.

[21] Appl. No.: 09/243,056

[22] Filed: Feb. 2, 1999

[51] Int. Cl.$^6$ ..................................................... C09B 57/08
[52] U.S. Cl. .................. 8/403; 8/647; 546/110; 510/500; 510/501
[58] Field of Search ................. 8/403; 546/110, 546/647; 510/501, 500

[56] References Cited

U.S. PATENT DOCUMENTS

| | | | |
|---|---|---|---|
| Re. 35,370 | 11/1996 | Henry | 73/40.7 |
| Re. 35,395 | 12/1996 | Henry | 73/40.7 |
| 2,385,106 | 9/1945 | Scalera et al. | 260/281 |
| 3,147,264 | 9/1964 | Klein | 260/281 |
| 4,464,281 | 8/1984 | Rapisarda et al. | 252/174.21 |
| 4,946,619 | 8/1990 | Fisher | 252/187.24 |
| 4,992,204 | 2/1991 | Kluger et al. | 252/301.16 |
| 5,215,679 | 6/1993 | Cramm et al. | 252/301.35 |
| 5,235,045 | 8/1993 | Lewis et al. | 534/560 |
| 5,294,664 | 3/1994 | Morrison, Jr. et al. | 524/560 |
| 5,308,773 | 5/1994 | Lewis et al. | 436/73 |
| 5,357,782 | 10/1994 | Henry | 73/40.7 |
| 5,420,136 | 5/1995 | Lewis et al. | 514/296 |
| 5,421,192 | 6/1995 | Henry | 73/40.7 |
| 5,472,878 | 12/1995 | Lewis et al. | 436/61 |
| 5,565,551 | 10/1996 | Lewis et al. | 530/405 |
| 5,681,984 | 10/1997 | Cavestri | 73/40.7 |
| 5,733,405 | 3/1998 | Bruhnke | 510/519 |
| 5,766,600 | 6/1998 | Lewis et al. | 424/204.1 |

FOREIGN PATENT DOCUMENTS 48-032177  10/1973  Japan.

*Primary Examiner*—John R. Hardee
*Attorney, Agent, or Firm*—Terry T. Moyer; William S. Parks

[57] ABSTRACT

This invention relates to compositions comprising naphthalimide derivative colorants themselves comprising naphthalimide backbones with specific water-solubilizing pendant moieties attached. These pendant moieties are based upon aryloxypolyoxyalkylene groups which provide the desired solubility to the naphthalimide colorant compound. Furthermore, the aryloxypolyoxyalkylene groups facilitate the further addition of other pendant groups to the base compound which increase or decrease the solubility of the resultant naphthalimide derivative colorant as well. Such modified naphthalimides are useful as fluorescent colorants, particularly for and within other liquid media (such as liquid detergents). The particular types of compositions encompassed within this invention include aqueous and non-aqueous media, such as, without limitation, liquid detergents, hard surface cleaners, fabric softeners, light duty liquid cleaning compositions, paint strippers, cleaning solvents, and the like.

2 Claims, No Drawings

COMPOSITIONS COMPRISING ARYLOXYPOLYOXYALKYLENE NAPHTHALIMIDE DERIVATIVE COLORANTS

FIELD OF THE INVENTION

This invention relates to compositions comprising naphthalimide derivative colorants themselves comprising naphthalimide backbones with specific water-solubilizing pendant moieties attached. These pendant moieties are based upon aryloxypolyoxyalkylene groups which provide the desired solubility to the naphthalimide colorant compound. Furthermore, the aryloxypolyoxyalkylene groups facilitate the further addition of other pendant groups to the base compound which increase or decrease the solubility of the resultant naphthalimide derivative colorant as well. Such modified naphthalimides are useful as fluorescent colorants, particularly for and within other liquid media (such as liquid detergents). The particular types of compositions encompassed within this invention include aqueous and non-aqueous media, such as, without limitation, liquid detergents, hard surface cleaners, fabric softeners, light duty liquid cleaning compositions, paint strippers, cleaning solvents, and the like.

DISCUSSION OF THE PRIOR ART

All U.S. and foreign patents cited within this specification are hereby incorporated by reference.

Liquid household compositions, such as detergents, fabric softeners, dishwashing compositions, and the like, in the past have been provided as colored formulations for aesthetic reasons and brand identity. Although white and/or clear compositions have been commercialized in the past as well, the modern consumer often prefers attractively colored cleaning, etc., products. One unique coloring method for such compositions has been the addition of fluorescent colorants, most notably uranine. Such a colorant provides for very bright fluorescing colorations which are aesthetically pleasing and which facilitate brand recognition. Uranine, however, has a tendency to lose its fluorescing characteristics over time and thus eventually results in a colored composition which loses its bright, fluorescent hue over a relatively short duration. As such, there is a need to develop a fluorescent colorant within household cleaning, etc., compositions which will not appreciably degrade in its color intensity and fluorescent ability over a long shelf and product life. To date, the household composition industries have not been accorded such a highly desirable improvement in colorant technology.

Naphthalimide colorants generally provide effective and desirable fluorescent colorations within different media, particularly in color detection applications. However, such colorants generally require dissolution within specific solvents in order to provide color to and/or within media in which they are not soluble. If such colorants are solid in nature they must first be dispersed within liquid media through the use of surfactants or solvents and may also become undispersed over time and accumulate at the bottom of such compositions, thereby creating coloring problems. For example, standard non-water-soluble naphthalimide colorants exist as waxes or oily solids which are difficult to introduce within aqueous media. Modifications of the standard naphthalimide colorants should thus be performed which provide water solubility and ultimately permit desirable fluorescent colorations within aqueous compositions.

There are no prior teachings which disclose specific liquid naphthalimide derivative colorants comprising aryloxypolyoxyalkylene pendant groups. There are previous disclosures regarding polyoxyalkylenated naphthalimides, such as U.S. Pat. No. 4,992,204, to Kluger et al., as well as the production and utilization of other, solid naphthalimide-based colorants, including U.S. Pat. No. Re. 35,370, to Henry, U.S. Pat. No. Re. 35,395, to Henry, U.S. Pat. No. 2,385,106, to Scalera et al., U.S. Pat. No. 3,147,264, to Klein, U.S. Pat. No. 5,235,045, to Lewis et al., U.S. Pat. No. 5,308,773, to Lewis et al., U.S. Pat. No. 5,357,782, to Henry, U.S. Pat. No. 5,420,136, to Lewis et al., U.S. Pat. No. 5,421,192, to Henry, U.S. Pat. No. 5,472,878, to Lewis et al., U.S. Pat. No. 5,565,551, to Lewis et al., U.S. Pat. No. 5,681,984, to Cavestri, and U.S. Pat. No. 5,766,600, to Lewis et al. The Scalera et al. reference appears to disclose the production of a highly viscous naphthalimide derivative; however, it has been determined that patentee's product is highly viscous only at the elevated temperatures at which the reactants are subjected during production of such a colorant. In fact, patentee's colorants all exist as solids at room temperature and thus all have measurable melting points. None of these patents discloses or fairly suggests the same specific water-soluble naphthalimide derivative compounds as mentioned above. Of particular importance is the production of a fluorescent, liquid compound for utilization as a fluorescing colorant within various aqueous or non-aqueous based systems. It has been taught in the past, such as within my U.S. patent application Ser. No. 09/025,201, that either etheramines or branched long-chain alkylamine reactants were necessary to produce suitably liquid naphthalimide-derivative colorants. However, these colorants are only oil-soluble. There is no disclosure within this application to naphthalimide colorant compounds which comprise polyoxyalkylene moieties so as to provide a water-soluble highly effective fluorescent colorant for utilization with aqueous media. Furthermore, there is no teaching or fair suggestion within the pertinent art which even alludes to a naphthalimide colorant which can be adapted for use in different media through the alteration of the chain length of polyoxyalkylene pendant groups. Thus, there still exists a need to develop such a particular type of intermediate, as well as different naphthalimide derivatives which are liquid in nature at ambient temperature and pressure and while substantially pure exhibiting different chain-length pendant groups at the available reactive sites on the base compound. Again, the prior art has not accorded such an improvement within this specific colorant industry.

DESCRIPTION OF THE INVENTION

It is thus an object of the invention to provide a composition, such as, for example, a household composition (i.e., liquid detergent, fabric softener, etc.), which is brightly colored through the utilization of at least one water-soluble fluorescent aryloxypolyoxyalkylene naphthalimide derivative colorant. It is another object of this invention to protect uranine fluorescent colorants from degradation within compositions through the utilization of at least one water-soluble naphthalimide fluorescent colorant in combination with the uranine. A further object of the invention is to provide a household composition which will not exhibit any appreciably staining on target substrates and thus only provides fluorescent colorations to the target household composition. Yet another object of this invention is to provide a relatively inexpensive and yet highly effective fluorescent water-soluble naphthalimide derivative colorant for use within household compositions.

The present invention encompasses certain compositions comprising water-soluble fluorescent naphthalimide aryloxypolyoxyalkylene derivative colorants. Such water solubility provides these naphthalimide compounds with a distinct advantage over other naphthalimide derivatives which are generally solid or waxy in nature and highly insoluble in aqueous media. Since most household compositions are water-based, the colorants of the inventive compositions will not precipitate out of solution, unlike their water insoluble counterparts. Furthermore, the inventive compounds provide excellent fluorescing and coloring characteristics within such media, and are particularly effective when combined with other colorants, dyes, and pigments. As such, the inventive aryloxypolyoxyalkylene derivative naphthalimide colorant compounds can be utilized in applications where standard naphthalimide dyes were inoperable in the past. The inventive colorants can be utilized over a wide pH range and are compatible with fragrances and preservatives, as merely examples, without complexing or destabilizing the resultant mixture. These colorants are also compatible with most cationic, anionic, non-ionic, and quaternary systems. The inventive aryloxypolyoxyalkylene derivative naphthalimide colorants can withstand pH levels of as low as 3.0 and thus can be utilized in acidic media, such as fabric softening compositions and certain cleaning solutions, whereas conventional fluorescent colorants, such as uranine, are not compatible within such low pH formulations. Lastly, since the inventive colorants produce true solutions and not emulsions nor dispersions, the formulations made therefrom are homogeneous, clear, and brilliant in appearance.

Furthermore, it has quite unexpectedly been found that the simultaneous use of the water soluble aryloxypolyoxyalkylene naphthalimide derivative colorants of the instant invention in combination with the standard low-cost and fluorescent colorant, uranine, in certain compositions has provided an effective manner of prolonging the fluorescent characteristics of the uranine colorant for a period of time considerably longer than through the utilization of uranine alone or in combination with other common fluorescent colorants. In general, it has been found that liquid compositions colored with fluorescent colorants exhibit lightfastness problems due to the need for long shelf-life stability in conjunction with the standard utilization of transparent plastic containers. For instance, if a composition is colored fluorescent green, generally a combination of a fluorescent acid yellow colorant and acid blue colorant has been combined to produce such a distinctly colored formulation. Over a period of time and exposure to light, this mixture will fade and degrade into a blue colored composition if the yellow if not sufficiently lightfast. The inventive aryloxypolyoxyalkylene naphthalimide derivative colorants exhibit excellent lightfastness, particularly over a long shelf life. Uranine itself exhibits excellent and desirable fluorescent coloring characteristics in liquid compositions; however, the lightfastness is poor for such a colorant. When mixed with the inventive naphthalimide colorant, the uranine appears to be protected from degradation of its fluorescent characteristics. Not to be bound by any scientific theory or explanation, it is believed that the inventive naphthalimide colorants exhibit absorbances over a range of wavelengths which overlap with the range of absorbance exhibited by uranine. Thus, the naphthalimide seemingly protects the uranine from over exposure to light in those overlapping wavelengths which may hasten the degradation of the uranine's fluorescent properties. This phenomenon is discussed further below.

Accordingly, this invention encompasses a composition comprising at least one compound selected from the group consisting of a tensoactive, a fabric softener, a solvent, and any combinations thereof;

at least one water-soluble aryloxypolyoxyalkylene derivative naphthalimide colorant; and optionally, a uranine colorant.

Preferably, the particular alkyleneoxy groups of the inventive aryloxypolyoxyalkylene derivative naphthalimide colorants are selected from ethyleneoxy (EO), propyleneoxy (PO), and butyleneoxy (BO) groups. Preferably these moieties are all EO groups, although combinations of EO and any of the others may be utilized as well. Preferably from about 2 to about 50 moles of alkyleneoxy groups are present on each separate polyoxyalkylene pendant group; more preferably from about 2 to 10 moles; and most preferably from about 2 to 6 moles. The term "polyoxyalkylene" is intended to encompass any pendant group which includes at least two alkyleneoxy moieties.

The addition of polyoxyalkylene groups to the naphthalimide base compound may be accomplished through the reaction of 4-halo-1,8-naphthalic anhydride with a number of different compounds. One type of reaction includes the initial imidization of the anhydride compound by the condensation of aryloxypolyoxyalkyleneamine. This reaction does not affect the halogen atom on the anhydride thereby permitting a further substitution reaction with the halogen to add either more polyoxyalkylene groups (to increase water solubility) or other moieties, such as oxyalkylamines, alkylamines, cyclic groups, such as morpholine, piperidine, and pyrrolidine groups (as merely examples), and the like, to alter the solubility or coloring characteristics of the naphthalimide derivative compound. Such a further substitution reaction displaces the halogen atom from the initial aryloxypolyoxyalkylene compound. In such a reaction, it is generally necessary to add an hydrochloric acid scavenger (such as sodium carbonate or excess amine) to control the pH of the reaction.

The intermediate of this procedure is represented by the following formula (I)

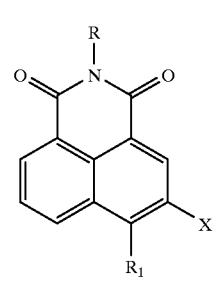

(I)

wherein, R is aryloxypolyoxyalkylene; $R^1$ is selected from the group consisting of hydrogen, lower alkyl, lower hydroxyalkyl, and polyoxyalkylene; or $R^1$ and $R^2$ taken together and with the N form a cyclic group; X is halo (chloro or bromo); and Y is selected from the group consisting of hydrogen, $SO^-_3$, and $NO_2$. The inventive colorant then is represented by the following formula (II):

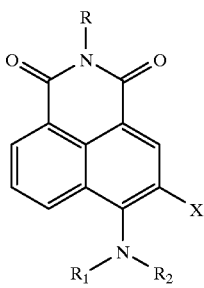

(II)

wherein, R is aryloxypolyoxyalkylene; $R^1$ and $R^2$ are the same or different and are selected from the group consisting of hydrogen, lower alkyl, lower hydroxyalkyl, and polyoxyalkylene; or $R^1$ and $R^2$ taken together and with the N form a cyclic group; and X is selected from the group consisting of hydrogen, $SO^-_3$, and $NO_2$.

Preferably, the water soluble aryloxypolyoxyalkylene derivative naphthalimide colorants are liquid in nature at ambient temperature and pressure and at substantial purity; however, pasty or waxy colorants (which are readily soluble in water) are also encompassed within this invention. The term ambient temperature and pressure means from about 20 to about 25° C. at a pressure of from about 0.8 to about 1.2 atmospheres. Furthermore, substantial purity means that the colorant is at least 90% free from solvent, diluent, surfactant, and any other compound which may dilute the colorant compound. The target inventive compositions will include at least one surfactant, solvent, fabric softener, and the like, as well as other standard colorant additives, such as resins, preservatives, pH adjusters, foam depressants, antistatic compounds, enzymes, bactericides, fungicides, stabilizers, and the like. However, these compounds do not factor into the measure of the liquid state of the target colorants of this invention and are merely required within the inventive compositions upon production thereof.

Compositions encompassed within this invention include, but are not limited to, liquid household detergents and cleaners (for laundry, dishwashing, light duty cleaning compositions, bathroom cleaners, hard surface cleaners, heavy duty cleaning compositions, floor cleaners, and the like), fabric softeners, paint strippers, wax strippers, autocare formulations (such as transmission fluid, brake fluid, and the like) and myriad others. Formulations of suitable compositions of the present invention include both gel and liquid compositions. Such compositions require at least one component selected from the group consisting essentially of a tensoactive, a fabric softener compound, a solvent, and any combinations thereof. These components are discussed at greater length below. The following lists of suitable components are not intended to limit the number and types suitable for use within the instant invention, as those of ordinary skill in the pertinent arts would appreciate the sheer amount of possible compounds which meet all of the aforementioned definitions for use within the inventive compositions.

Cleaning Compositions

Liquid detergents, light duty cleaning liquids, heavy duty cleaning liquids, floor cleaners, bathroom cleaners, and the like, encompassed by invention all comprise tensoactives and water. These compounds are present in order to improve the ability of the composition to clean or remove, soil, stains, and the like, and may also function as suds boosters. Suitable tensoactives include nonionic surfactants, anionic surfactants, cationic surfactants, amphoteric surfactants, zwitterionic surfactants, and soaps. Any alkyl- or alkenyl- groups listed below are from $C_1$ to $C_{12}$ in length unless otherwise noted. Among the nonionic surfactants are included ethoxylated or propoxylated fatty alcohols and acids, ethoxylated or propoxylated alkyl phenols, fatty acid amides, such as diethanolamides, amine oxides, phosphine oxides, polyglucosides, sulfoxides, polyoxyethylene-polyoxypropylene block copolymers, and silicon glycols. Anionic surfactants include linear or branched alkylbenzene, toluene, xylene, or naphthalene sulfonates, alkyl sulfonates and sulfates, fatty ether sulfates, ammonium ethoxysulfate, sodium ethoxysulfate, phosphate esters, alkyl and alkylenyl carboxylic acids and fatty acids (and their salts), ethoxylated alcohol sulfates, alkyl glyceryl ether sulfonates, α-sulfonated fatty acid esters, 2-acyloxyalkane-1-sulfonates, olefin and paraffin sulfonates, and β-alkoxyalkane sulfonates. Possible cationic surfactants include quaternary ammonium salts, amines, and amine oxides. Suitable amphoterics include mixed $C_8$ amphocarboxylates, cocamphocarboxyglycinates, and derivatives of aliphatic heterocyclic secondary and tertiary amines. Suitable zwitterionics include betaines, such as cocamidopropyl betaine, derivatives of quaternary ammonium, phosphonium, and sulfonium compounds. Soaps include any saponified fatty acids made from oils and fats (such as from tallow, coconut oil, babasu oil, palm oil, kernel oil, rosin, stearic acid, and other vegetable oils).

Tensoactives will generally be present in proportions depending primarily on the desired end use for the particular household cleaning composition. Thus, for light duty liquids, tensoactives are present from about 0.01 to about 25% by weight of the entire composition; for liquid detergents, from about 0.1 to about 30% by weight; for heavy duty detergents, from about 2 to about 75% by weight, and so on.

Other possible components within such detergent compositions include builders/softeners, solvents, hydrotropes, pH adjusters, bleaches, bleach activators, optical brighteners, abrasives, suds boosters, suds depressors, soil suspending/release agents, anti-redeposition agents, enzymes, enzyme stabilizers, chlorine scavengers, perfumes, anti-corrosion agents, fungicides, germicides, fillers (such as smectite clays, and the like), and other colorants (such as reactive, acid, solvent, and the like dyes). Such compounds are well known within the detergent art.

The primary constituent of the aforementioned cleaning compositions is water as a solvent. Other non-aqueous solvents may also be used, including lower alcohols (ethanol, methanol, and isopropanol, for example), ethylene glycol monobutyl ether, propylene glycol monomethyl ether, dipropylene glycol monomethyl ether, propylene glycol, o-benzyl-4-chlorophenol, deodorized kerosene, odorless mineral spirits, pine oil, n-methyl-pyrrolidone, wax, d-limonene, methylglycol, terpenes, and white spirits. Furthermore, the compositions of this invention may only comprise solvents other than water in certain circumstances as long as the colorant easily disperses within the solvent (such as d-limonene or propylene glycol, as merely examples).

In general, such compositions comprise anywhere from 1 to 99% by weight of the total composition water, preferably from about 20 to about 80% water, and most preferably from about 20 to about 60% water, again depending on the desired end use. Solvents may comprise from 0 to about 40% by weight of the total composition, preferably from about 0.1 to about 25%. The other adjuvants and additives delineated above may comprise from about 0.01 to about 35% by weight of the total composition, preferably from about 0.1 to about 20%. The inventive colorant is added in an amount from about 0.0001 to about 2.0% by weight of the total composition; preferably from about 0.001 to about 1.0%; more preferably from about 0.002 to about 0.1%; and most preferably from about 0.003 to about 0.03%. Examples of different types of liquid cleaning compositions can be found in various United States patents. For instance, typical hard surface cleaners are disclosed within U.S. Pat. No. 5,378,387 to Houghton et al., U.S. Pat. No. 5,380,452 to Blanvalet et al., U.S. Pat. No. 5,382,376 to Michael et al., U.S. Pat. No. 5,389,282 to Saijo et al., U.S. Pat. No. 5,389,284 to van der Hoeven, U.S. Pat. No. 5,391,316 to Garrett et al., and U.S. Pat. No. 5,393,468 to Erilli et al.; typical bathroom cleaners are taught within U.S. Pat. No. 5,061,393 to Linares et al., and U.S. Pat. No. 5,384,063 to Ah-Man Woo et al.; typical dishwashing detergent are disclosed within U.S. Pat. No. 4,316,824 to Pancheri, U.S. Pat. No. 5,378,409 to Ofosu-Asante et al., U.S. Pat. No. 5,385,696 to Repinec, Jr. et al., U.S. Pat. No. 5,387,373 to Nail, U.S. Pat. No. 5,387,375 to Erilli et al., and U.S. Pat. No. 5,389,305 to Repinec et al.; and typical liquid laundry detergents are taught within U.S. Pat. No. 4,133,779 to Hellyer et al., U.S. Pat. No. 4,261,868 to Hora et al., U.S. Pat. No. 4,285,441 to Barratt et al., U.S. Pat. No. 4,318,818 to Letton et al, U.S. Pat. No. 4,515,705 to Moeddel, U.S. Pat. No. 4,537,706 to Severson, Jr., U.S. Pat. No. 4,537,707 to Severson, Jr., U.S. Pat. No. 4,597,898 to VanderMeer, U.S. Pat. No. 4,810,409 to Harrison et al., U.S. Pat. No. 4,968,451 to Scheibel et al., U.S. Pat. No. 5,147,576 to Montague et al., U.S. Pat. No. 5,288,431 to Huber et al., U.S. Pat. No. 5,288,746 to Pramod, U.S. Pat. No. 5,331,100 to Smith et al., U.S. Pat. No. 5,354,491 to Bjorkquist et al., U.S. Pat. No. 5,364,550 to Manzo et al., U.S. Pat. No. 5,385,681 to Sato et al., and U.S. Pat. No. 5,385,685 to Humphreys et al.

Fabric Softening Compositions

Such compositions all comprise well known fabric softening formulations and compounds. Formulations of suitable fabric softener compositions of the present invention except the colorant are disclosed in U.S. Pat. No. 5,183,580 to Lew et al., U.S. Pat. No. 5,207,933 to Trinh et al., U.S. Pat. No. 5,204,010 to Klewsaat, U.S. Pat. No. 5,290,475 to Wixon, U.S. Pat. No. 5,130,035 to Dell'Armo et al., and U.S. Pat. No. 5,089,148 to Van Blarcom et al. The liquid fabric softener composition of the present invention would include from about 3 to about 50% by weight of the total composition, preferably from 15 to about 35% by weight of a cationic fabric softening compound, preferably a quaternary ammonium compound. The counterion may be a halide, such as fluoride, chloride, bromide, or iodide. Other counterions may be employed such as methylsulfate, ethylsulfate, hydroxide, acetate, formate, sulfate, carbonate, and the like. Preferably, the counterion is chloride or methylsulfate, chloride being especially preferred for liquid fabric conditioning compositions of the present invention. Generally, concentrated liquid fabric softener compositions of the present invention can contain 17% to 50% solids. Particulate fabric softening compositions of the present invention can be prepared according to the formulation set out in U.S. Pat. No. 5,332,513 to Doms et al.

Examples of cationic quaternary ammonium salts include, but are not limited to:

(1) Acyclic quaternary ammonium salts having at least two $C_{8-30}$, preferably $C_{12-22}$ alkyl chains, such as: ditallowdimethyl ammonium chloride (Adogen® from Sherex), di(hydrogenated tallow) dimethyl ammonium chloride (Adogen 442® from Sherex), distearyldimethyl ammonium chloride (Arosurf TA-1000® from Sherex), dicocodimethyl ammonium chloride (Variquat K300® from Sherex), and the like;

(2) Cyclic quaternary ammonium salts of the imidazolinium type such as di(hydrogenated tallow)-dimethyl imidazolinium chloride, 1-ethylene-bis(2-tallow-1-methyl) imidazolinium chloride (Varisoft 6112® from Sherex), and the like;

(3) Diamido quaternary ammonium salts such as: methyl-bis(hydrogenated tallow amidoethyl)-2-hydroxyethyl ammonium methylsulfate (Varisoft 110® from Sherex), methyl-bis(tallowamidoethyl)-2-hydroxypropyl ammonium methylsulfate (Varisoft 238® from Sherex), and the like;

(4) Biodegradable quaternary ammonium salts such as N,N-di(tallowoyl-oxy-ethyl)-N,N-dimethyl ammonium chloride and N,N-di(tallowoyl-oxy-propyl)-N,N-dimethyl ammonium chloride.

When fabric conditioning compositions employ biodegradable quaternary ammonium salts, the pH of the composition is adjusted to between about 2 and 7, preferably from 3 to about 5. Biodegradable ammonium salts are described more fully in U.S. Pat. Nos. 4,767,547 and 4,789,491.

Biodegradable cationic diester compounds may be employed of the type which have the formula:

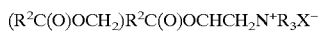

$$(R^2C(O)OCH_2)R^2C(O)OCHCH_2N^+R_3X^-$$

wherein each R is a short chain $C_{1-6}$, preferably $C_{1-3}$, alkyl or hydroxyalkyl group, e.g., methyl (most preferred), ethyl, propyl, hydroxyethyl, and the like, benzyl, or mixtures thereof; each $R^2$ is a long chain $C_{10-22}$ hydrocarbyl, or substituted hydrocarbyl substituent, preferably $C_{15-19}$ alkyl and/or alkylene, most preferably $C_{15-17}$ straight chain alkyl and/or alkylene; and the counterion, $X^-$, can be any softener-compatible anion, for example, chloride, bromide, methylsulfate, formate, sulfate, nitrate, and the like. These cationic diesters are described in greater detail in U.S. Pat. No. 4,137,180.

The fabric softening compositions of the present invention comprise a water carrier, up to 5% by weight of the total composition organic solvents, such as lower alcohols, which can improve handling, fluidity, and viscosity. From 3 to about 50% by weight of the total composition comprises the active softening compounds discussed above. Preferably, the fabric softeners are acyclic quaternary ammonium salts with ditallowdimethyl ammonium chloride being the most preferred. Also included within these compositions may be other non-cationic fabric conditioning agents such as tertiary fatty amines, reaction products of stearic acid and aminoethylethanolamine, carboxylic acids having from 8 to 30 carbon atoms and one carboxylic acid group per molecule. esters of polyhydric alcohols such as sorbitan esters or glyceryl stearate, fatty alcohols, ethoxylated fatty alcohols, alkylphenols, ethoxylated alkylphenols, ethoxylated fatty amines, ethoxylated monoglycerides, ethoxylated diglycerides, ethoxylated fatty amines, mineral oils, and polyols, such as polyethylene glycol. Furthermore, pH adjusters should be added to adjust the pH of the inventive fabric softening composition to below about 7.0, preferably in the range of 4 to about 6.5. If necessary, any acidic material may be utilized to perform this function, such as hydrochloric acid, citric acid, maleic acid, and the like.

The inventive colorant is added in an amount from about 0.001 to about 3.0% by weight of the total composition; preferably from about 0.003 to about 1.0%; more preferably from about 0.01 to about 0.1%; and most preferably from about 0.015 to about 0.02%. Other additives may be present in amounts from about 0.1 to about 30% by weight of the total composition in order to provide increased softening performance, composition stability, viscosity modifications, dispersibility, and soil release. These additives include silicones, predominantly polydimethylsiloxanes; soil release polymers such as block copolymers of polyethylene oxide and terephthalate fatty amines; amphoteric surfactants; smectite clays; anionic soaps; zwitterionic surfactants; and nonionic surfactants. Such surfactants and soaps mirror those discussed above in the cleaning compositions. Additionally, polymer additives may be present, such as guar gum, polyethylene oxide, and cyclodextrin. Electrolytes may also be added for viscosity control in amounts up to about 5% by weight of the total composition. Such electrolytes include calcium chloride, magnesium chloride, sodium chloride, and other Group IA and IIA halides, as well as alkylene polyammonium salts.

Preservatives, such as glutaraldehyde and formaldehyde may also be added, as well as emulsifiers, opacifiers, anti-shrink agents, anti-wrinkle agents, fabric crisping agents, spotting agents, antioxidants, anti-corrosion agents, optical brighteners, buffers, perfumes, germicides, bactericides, and bacteriostatic agents.

Liquid fabric softening compositions encompassed within this invention can be prepared through standard techniques. For example, a softening active premix is prepared at 50–80° C., to which is added, with stirring, hot water. The colorant can then be added at any time after the preparation of this mixture while temperature-sensitive compounds must be added at certain times during the cooling down period. Preferably, the colorant is added to the hot water prior to addition to the premix.

Such liquid compositions can thus be utilized in the rinse cycle of a standard home laundry operation. Since the colorants of invention are highly water soluble, there should be no appreciable staining of the target fabric substrate upon proper use of these inventive compositions.

Solvents

The inventive colorants may also be present in composition with a solvent. These are basically the same as listed above and include water, lower alcohols (ethanol, methanol, and isopropanol, for example), ethylene glycol monobutyl ether, propylene glycol monomethyl ether, dipropylene glycol monomethyl ether, propylene glycol, o-benzyl-4-chlorophenol, deodorized kerosene, odorless mineral spirits, pine oil, n-methyl-pyrrolidone, wax, d-limonene, methylglycol, terpenes, and white spirits. The compositions of this invention may comprise non-aqueous solvents (with no water present) as long as the colorant easily disperses within the solvent (such as d-limonene or propylene glycol, as merely examples). Such compositions include paint strippers, wax strippers, fuels, automobile fluids, and the like. Furthermore, such solvent/colorant compositions may be merely utilized as colorant concentrates or diluted colorant formulations for later use in preparing more particular colored compositions (such as fabric softener and/or cleaning compositions). Considering the water-soluble nature of the inventive colorants, should the need arise, a dispersant may be used to permit thorough mixing of the colorant within non-aqueous systems in order to produce an homogeneous composition. The inventive colorant would be added in an amount from about 0.001 to about 3.0% by weight of the total composition; preferably from about 0.005 to about 1.0%; more preferably from about 0.01 to about 0.1%; and most preferably from about 0.015 to about 0.05%. A dispersant (or dispersants) would be present in minimal amounts, such as from about 0.001 to about 0.01% by weight of the total composition. Various additives may also be present, including stabilizers, anti-corrosion agents, other surfactants, other dyes and colorants, and the like.

DESCRIPTION OF THE PREFERRED EMBODIMENT

The general method of making the preferred inventive colorant is as follows:

First, an intermediate of Formula (I), above was formed to which the necessary water-solubilizing and colorizing pendant groups were then added. The presence of an aryloxypolyoxyalkylene moiety permitted easy addition (by substitution reaction) of the necessary pendant groups in order to provide the desired color strength and shade as well as the targeted degree of water solubility which then resulted in the production of the final colorant of Formula (II), above.

The specific formulations below, as well as the following exemplified methods of coloring are thus indicative of the preferred embodiments of this invention:

Intermediate Formation

EXAMPLE 1

108.3 grams of O-polyethoxylated-p-aminophenol (95.5% solids), having an average of 10 moles of ethylene oxide, were mixed with 105 grams of water. The pH of the solution was adjusted to between 7 and 10 through the addition of sodium hydroxide. To the resulting mixture were added 27.5 grams of 4-chloro-1,8-naphthalic acid anhydride (available from Aceto Corporation). The mixture was gradually heated to about 130° C. and the water was allowed to distill from the reaction vessel. After 2 hours of heating at 130°, the reaction yielded 134 grams of a viscous brown liquid conforming to Formula (III):

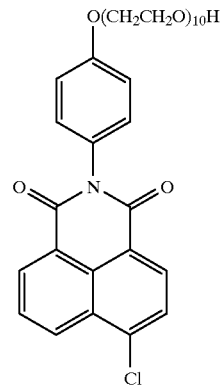

(III)

Colorant Compound Production from the Aryloxy Intermediate

EXAMPLE 2

15.8 grams of monoethanolamine and 7.2 grams of sodium carbonate were added to 134 grams of the precursor of EXAMPLE 1. The mixture was heated at 130° and stirred for 8 hours. The resultant composition was then cooled to obtain a viscous liquid of dark fluorescent yellow color and exhibiting excellent solubility in water corresponding to the structure in Formula (IV):

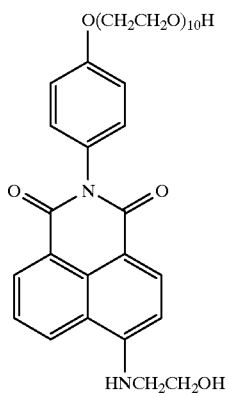

(IV)

Compositions Including the Colorants from the Examples Above

EXAMPLE 3

A light duty liquid detergent was produced having the following typical formulation:

| COMPOSITION | |
|---|---|
| Component | Proportion (% by weight) |
| $C_{12}$–$C_{15}$ fatty alcohol ethoxylate sulfate (60%) | 18.3 |
| C12 linear alkylbenzene sulfonate (60%) | 30.0 |
| Fatty acid diethanolamide | 4.0 |
| Sodium xylene sulfonate (40%) | 8.5 |
| Sodium chloride | 3.0 |
| Colorant from EXAMPLE 2* | 0.017 |
| Water, dyes, perfume, preservative | balance |

*The colorant is diluted with water to form a 50% colorant solution prior to introduction within the COMPOSITION Such a composition included an amount of colorant sufficient to give a color depth equal to a commercial sample containing uranine alone as the fluorescent colorant.

EXAMPLE 4

The inventive colorant of EXAMPLE 2, diluted to 50% in aqueous solution, was added to a colorless concentrated commercial liquid rinse-cycle fabric softener formulated for the U.S. market having 50% solids content of di(hydrogenated) tallow dimethylammonium chloride softener compound in an amount of about 0.017% by weight of the total composition. The resultant composition exhibited a bright yellow fluorescent hue. Such a composition included an amount of colorant sufficient to give a color depth equal to a commercial sample containing uranine alone as the fluorescent colorant.

Testing for Lightfastness

The COMPOSITION of EXAMPLE 3 was then tested for its lightfastness through subjection to the conditions of an accelerated lightfastness test. The composition was first analyzed for the initial maximum absorbance at the particularly monitored wavelength (445 nm). The tested composition was stored in a clear commercial plastic container and tested for lightfastness in accordance with AATCC Test Method 16E (Water-Cooled Xenon-Arc Lamp, Continuous Light). The COMPOSITION was placed in a sealed transparent plastic bottle and exposed to xenon-arc radiation using an Atlas Weatherometer, available from Atlas Electric Devices Company, Chicago, Ill. The absorbance of the test solution was measured on a UV-VIS Spectrophotometer before and after irradiation for specific durations of exposures. % Retained Absorbance was calculated as the ratio of the absorbance of the composition after irradiation to that before irradiation. The lightfastness was periodically tested during the duration of the exposure up to 12 hours. The results are tabulated below:

TABLE 1

| Hours of Exposure | % Retained Absorbance |
|---|---|
| 3 | ~98 |
| 6 | ~96 |
| 9 | ~95 |
| 12 | ~94 (93.8) |

The compositions of EXAMPLE 4 was then also tested for their lightfastness through subjection to the same Xenon-Arc Lamp test as above but for 3 hours in duration. After the 3 hour exposure the composition was then analyzed again for its retained absorbance at the 445 nm monitored wavelength. This composition retained over 99% (nearly 100%) of its absorbance upon 3 hours of exposure.

Naphthalimide/Uranine Composition Examples

The COMPOSITION of EXAMPLE 3 was then produced with the inventive aryloxypolyoxyalkylene derivative colorant of EXAMPLE 2, diluted to 50% in aqueous solution, combined with uranine in equal proportions (about 0.008% by weight) substituted for the colorant of EXAMPLE 2 alone. Such a composition included an amount of colorant sufficient to give a color depth equal to a commercial sample containing uranine alone as the fluorescent colorant. (A fabric softening composition could not be produced with this combination of colorants due to the instability of uranine in low pH compositions). This composition was then tested for its lightfastness through an accelerated lightfastness Xenon-Arc lamp test. After 5 hours and 12 hours of exposure, respectively, at monitored wavelengths of 495 nm for uranine and 445 mn for the inventive colorant, respectively, the colorants exhibited retained absorbances as follows:

TABLE 2

| Ex. | Exposure Time | Colorant | % Retained Absorbance |
|---|---|---|---|
| 5 | 5 hours | Colorant from EXAMPLE 2 | 93.4 |
| | | Uranine | 89.2 |
| | 12 hours | Colorant from EXAMPLE 2 | 87.0 |
| | | Uranine | 69.0 |

Comparative Examples

The COMPOSITION of EXAMPLE 3 was then produced with uranine alone, monitored at 495 nm (0.016% by weight). A commercially available liquid detergent product, DAWN® from The Procter & Gamble Company, was also tested for lightfastness. This commercial composition contains both uranine and D&C Yellow #10 (quinoline yellow). Such compositions included an amount of colorant sufficient to give color depths equal to the compositions from EXAMPLE 6, above. (Again, no low pH compositions could be tested with comparative colorants due to the instability of each in such media.) The compositions were subjected to the same accelerated lightfastness Xenon-Arc lamp test as described above. The results are tabulated below for 5 and 12 hour exposures:

TABLE 3

| | | (Comparative) | |
|---|---|---|---|
| Example | Exposure Time | Colorant(s) | % Retained Absorbance |
| 6 | 5 hours | Uranine | 24.7 |
| | 12 hours | Uranine | ~0.0 |
| 7 | 5 hours | D&C Yellow #10 | 88.5 |
| | | Uranine | 46.5 |
| | 12 hours | D&C Yellow #10 | 86.8 |
| | | Uranine | 1.6 |

Clearly, the retained absorbances, and thus the lightfastness measurements, of the composition comprising uranine alone as well as the commercially available fluorescent yellow-colored composition, are inferior to those measurements for the inventive compositions. The effective shelf-life of the inventive colored compositions thus easily outperforms those compositions within the relevant fluorescent-colored-liquid markets. Also, as noted above, the effective fluorescent colorations are available to the fabric softener market with the inventive aryloxypolyoxyalkylene derivative colorants but cannot be reproduced with other standard fluorescent colorants commonly utilized in detergent formulations. Such versatility of colorants, particularly those which exhibit highly favorable and desirable long-term fluorescence and long-term lightfastness, has not been readily available until now.

There are, of course, many alternative embodiments and modifications of the present invention which are intended to be included within the spirit and scope of the following claims.

What we claim is:

1. A composition comprising at least one compound selected from the group consisting of a tensioactive, a fabric softener, a solvent, and any combinations thereof; at least one aryloxypolyoxyalkylenated naphthalimide colorant, wherein said at least one aryloxypolyoxyalkylenated naphthalimide is defined by the following formula (I):

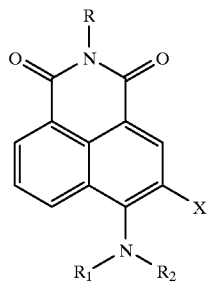

(I)

wherein, R is aryloxypolyoxyalkylene; $R^1$ and $R^2$ are the same or different and are selected from the group consisting of hydrogen, lower alkyl, lower hydroxyalkyl, and polyoxyalkylene; or $R^1$ and $R^2$ taken together and with the N form a cyclic group; and X is selected from the group consisting of hydrogen, $SO^-_3$, and $NO_2$; wherein the composition may optionally further comprise a uranine colorant.

2. The composition of claim 1 wherein said uranine colorant is present.

* * * * *